(12) United States Patent
Oya et al.

(10) Patent No.: US 11,209,790 B2
(45) Date of Patent: Dec. 28, 2021

(54) ACTUATOR CONTROL SYSTEM, ACTUATOR CONTROL METHOD, INFORMATION PROCESSING PROGRAM, AND STORAGE MEDIUM

(71) Applicant: OMRON Corporation, Kyoto (JP)

(72) Inventors: Taku Oya, Kyoto (JP); Hiroyuki Yanagi, Soraku-gun (JP); Yasuaki Abe, Ibaraki (JP); Yuki Taniyasu, Ritto (JP)

(73) Assignee: OMRON CORPORATION, Kyoto (JP)

( * ) Notice: Subject to any disclaimer, the term of this patent is extended or adjusted under 35 U.S.C. 154(b) by 113 days.

(21) Appl. No.: 16/086,538

(22) PCT Filed: Apr. 3, 2017

(86) PCT No.: PCT/JP2017/013935
§ 371 (c)(1),
(2) Date: Sep. 19, 2018

(87) PCT Pub. No.: WO2017/179452
PCT Pub. Date: Oct. 19, 2017

(65) Prior Publication Data
US 2019/0101885 A1    Apr. 4, 2019

(30) Foreign Application Priority Data

Apr. 15, 2016 (JP) .............................. JP2016-082096

(51) Int. Cl.
*G05B 19/05* (2006.01)
*B25J 9/16* (2006.01)
*G06T 7/73* (2017.01)

(52) U.S. Cl.
CPC .......... *G05B 19/058* (2013.01); *B25J 9/1697* (2013.01); *G05B 19/054* (2013.01); *G06T 7/73* (2017.01);
(Continued)

(58) Field of Classification Search
CPC .......... G05B 19/054; G05B 2219/1133; G05B 19/34443; G05B 19/37019;
(Continued)

(56) References Cited

U.S. PATENT DOCUMENTS

2005/0055127 A1   3/2005   Swain et al.
2007/0210740 A1   9/2007   Sato et al.
(Continued)

FOREIGN PATENT DOCUMENTS

CN   101034283 A   9/2007
CN   102218652 A   10/2011
(Continued)

OTHER PUBLICATIONS

Machine Translation for JP2003211381, obtained Oct. 2019.*
(Continued)

*Primary Examiner* — Darrin D Dunn
(74) *Attorney, Agent, or Firm* — Metrolex IP Law Group, PLLC

(57) ABSTRACT

An actuator control system includes: a transmission control unit configured to transmit final data, which is a final result of the computation by a sensor output computation unit, and to transmit intermediate data before transmitting the final data; and a command value computation unit configured to compute a command value for driving an actuator, based on the intermediate data and the final data transmitted by the transmission control unit.

9 Claims, 10 Drawing Sheets

(52) U.S. Cl.
CPC .............. *G05B 2219/1133* (2013.01); *G05B 2219/34443* (2013.01); *G05B 2219/37019* (2013.01); *G05B 2219/37294* (2013.01); *G05B 2219/40053* (2013.01); *G05B 2219/40536* (2013.01); *G05B 2219/40543* (2013.01); *G05B 2219/41105* (2013.01)

(58) Field of Classification Search
CPC ........ G05B 19/37294; G05B 19/40053; G05B 19/40536; G05B 19/40543; G05B 19/41105; B25J 9/1697; G06T 7/73
See application file for complete search history.

(56) References Cited

U.S. PATENT DOCUMENTS

| | | |
|---|---|---|
| 2008/0082213 A1 | 4/2008 | Ban et al. |
| 2010/0119146 A1 | 5/2010 | Inazumi |
| 2010/0274391 A1* | 10/2010 | Dai ................ B25J 9/1697 700/259 |
| 2011/0150286 A1 | 6/2011 | Ishigami et al. |
| 2012/0209430 A1 | 8/2012 | Igarashi et al. |
| 2012/0226382 A1 | 9/2012 | Asada |
| 2012/0294509 A1 | 11/2012 | Matsumoto |
| 2012/0296469 A1* | 11/2012 | Yoshinaga ............ B25J 19/023 700/218 |
| 2013/0114861 A1 | 5/2013 | Takizawa |
| 2013/0238124 A1* | 9/2013 | Suzuki ................ B25J 9/1697 700/250 |
| 2013/0274921 A1 | 10/2013 | Aiso |
| 2013/0329954 A1 | 12/2013 | Ikeda et al. |
| 2014/0096560 A1 | 4/2014 | Kim et al. |
| 2014/0257561 A1 | 9/2014 | Asada |
| 2014/0277719 A1 | 9/2014 | Kamiya et al. |
| 2014/0365010 A1 | 12/2014 | Yasuda et al. |

FOREIGN PATENT DOCUMENTS

| | | |
|---|---|---|
| CN | 103085076 A | 5/2013 |
| CN | 103372862 A | 10/2013 |
| CN | 104057456 A | 9/2014 |
| JP | H6-137828 A | 5/1994 |
| JP | 2003-211381 A | 7/2003 |
| JP | 2008-87074 A | 4/2008 |
| JP | 2011-133273 A | 7/2011 |
| JP | 2012-166308 A | 9/2012 |
| JP | 2012-183606 A | 9/2012 |
| JP | 2014-76792 A | 5/2014 |
| JP | 2014-237188 A | 12/2014 |

OTHER PUBLICATIONS

Machine Translation for JP-H06137828, obtained Oct. 2019.*
English translation of the International Search Report of PCT/JP2017/013935 dated Jun. 27, 2017.
English translation of the Written Opinion of PCT/JP2017/013935 dated Jun. 27, 2017.
Extended European search report dated Jul. 8, 2019 in a counterpart European patent application.
Chinese Office Action dated Nov. 4, 2020 for the counterpart Chinese patent application.

* cited by examiner

ACTUATOR CONTROL SYSTEM, ACTUATOR CONTROL METHOD, INFORMATION PROCESSING PROGRAM, AND STORAGE MEDIUM

TECHNICAL FIELD

The present invention relates to an actuator control system, an actuator control method, an information processing program, and a storage medium.

RELATED ART

Conventionally, systems for driving actuators based on sensor output signals have been developed.

In Patent Documents 1 and 2, the period of time to complete driving of an actuator is shortened by shortening the period of time to detect a workpiece (object) with a sensor. In Patent Document 3, this period of time is shortened by reducing the number of times of transfer failures of a workpiece (object).

RELATED ART DOCUMENTS

Patent Documents

Patent Document 1: JP 2014-237188A (published on Dec. 18, 2014)
Patent Document 2: JP 2011-133273A (published on Jul. 7, 2011)
Patent Document 3: JP 2008-87074A (published on Apr. 17, 2008)

SUMMARY OF THE INVENTION

Problem to be Solved by the Invention

However, all of Patent Documents 1 to 3 are problematic in that the system control performance is insufficient due to the following problems (1) and (2).

(1) After acquisition of information on an object is completed, driving of an actuator is started. In other words, the time to start driving of an actuator is late. This fact prevents the period of time from when information on an object is acquired to when driving of an actuator is completed from being shortened.

(2) Typically, a sensor used to acquire information on an object and an actuator are controlled in predetermined control cycles. Accordingly, there is a time lag between a sensor detection timing and an actuator driving timing, and thus the actuator cannot be precisely controlled.

The present invention was arrived at in order to address the above-described problems. It is an object thereof to provide an actuator control system in which the actuator control performance can be improved.

Means for Solving the Problems

In order to address the above-described problems, an aspect of the present invention is directed to an actuator control system for controlling driving of an actuator based on a sensor output signal, the system including: a sensor output computation unit configured to perform a computation on the sensor output signal; a transmission control unit configured to transmit final data, which is a final result of the computation by the sensor output computation unit, and to transmit intermediate data before transmitting the final data; and a command value computation unit configured to compute a command value for driving the actuator, based on the intermediate data and the final data transmitted by the transmission control unit.

In the above-described configuration, it may take time for the sensor output computation unit to complete the computation of final data depending on the computation content. On the other hand, with this configuration, the command value computation unit can receive intermediate data before receiving the final data. Accordingly, the command value computation unit can perform computation based on the intermediate data acquired before the sensor output computation unit completes its computation of the final data. Thus, it is possible to control the actuator at higher velocity or more precisely.

Furthermore, an aspect of the present invention is directed to an actuator control method for controlling driving of an actuator based on a sensor output signal, the method including: a sensor output computation step of performing a computation on the sensor output signal; a transmission control step of transmitting final data, which is a final result of the computation in the sensor output computation step, and transmitting intermediate data before transmitting the final data; and a command value computation step of computing a command value for driving the actuator, based on the intermediate data and the final data transmitted in the transmission control step.

With this configuration, it is possible to realize an actuator control method having similar effects to those of the actuator control system of the present invention.

Effects of the Invention

The present invention achieves the effect that the actuator control performance can be improved.

BRIEF DESCRIPTION OF THE DRAWINGS

FIG. 5 shows graphs of an example of computation by a sensor output computation unit, wherein FIG. 5(a) shows computation at high velocity and a low level of precision, and FIG. 5(b) shows computation at low velocity and a high level of precision.

EMBODIMENTS OF THE INVENTION

Figure 1:
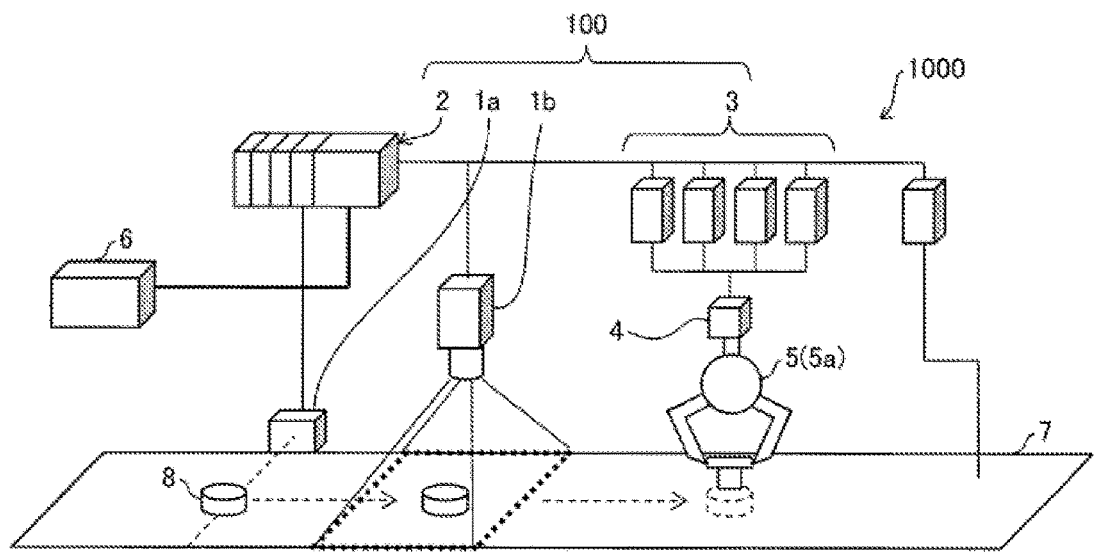
FIG. 1 is a schematic view showing an example of a system including an actuator control system of the present invention.

Hereinafter, embodiments for implementing the present invention will be described with reference to FIGS. 1 to 12. For the sake of ease of description, constituent elements having the same functions as those in the foregoing description are denoted by the same reference numerals, and a detailed description thereof has been omitted.

FIG. 1 is a schematic view showing a system 1000 including an actuator control system 100. The system 1000 includes the actuator control system 100, an actuator 4, a target 5 that is to be driven by the actuator (hereinafter, simply referred to as a "driving target 5"), an HMI 6, and a conveyor 7. The actuator control system 100 includes sensor units 1a and 1b (excluding an object information acquiring unit 22, which will be described later), a control apparatus 2, and a drive circuit 3. In the system 1000, the driving target 5 is a robot 5a configured to grip and move a target object 8.

The sensor units 1a and 1b are constituted by a sensor head configured to detect the position and the shape of the target object 8, and its peripheral circuitry. Note that the sensor head and the peripheral circuitry may be provided as separate members as described later. In the system 1000, the sensor unit 1a detects whether or not the target object 8 has passed through a location in front of the sensor unit 1a, and the sensor unit 1b captures an image of the target object 8, triggered by the sensor unit 1a detecting that the target object 8 has passed through a location in front of the sensor unit 1a.

The control apparatus 2 is constituted by, for example, a PLC (programmable logic controller). The control apparatus 2 computes a command value for controlling driving of the actuator 4, based on the data supplied from the sensor units 1a and 1b, and supplies it to the drive circuit 3.

The drive circuit 3 controls driving of the actuator 4, based on the command value supplied from the control apparatus 2. The actuator 4 is driven by the drive circuit 3, and gives a motive power to the driving target 5. The driving target 5 is mechanically operated by the actuator 4, and is the robot 5a configured to grip and move the target object 8 in the system 1000 as described above. The HMI 6 is a display input apparatus of the touch panel type, and a user can operate the control apparatus 2 or see the operation state of the control apparatus 2, using the HMI 6. The conveyor 7 is driven by the control apparatus 2, and conveys the target object 8 placed on the conveyor 7.

Figure 2:
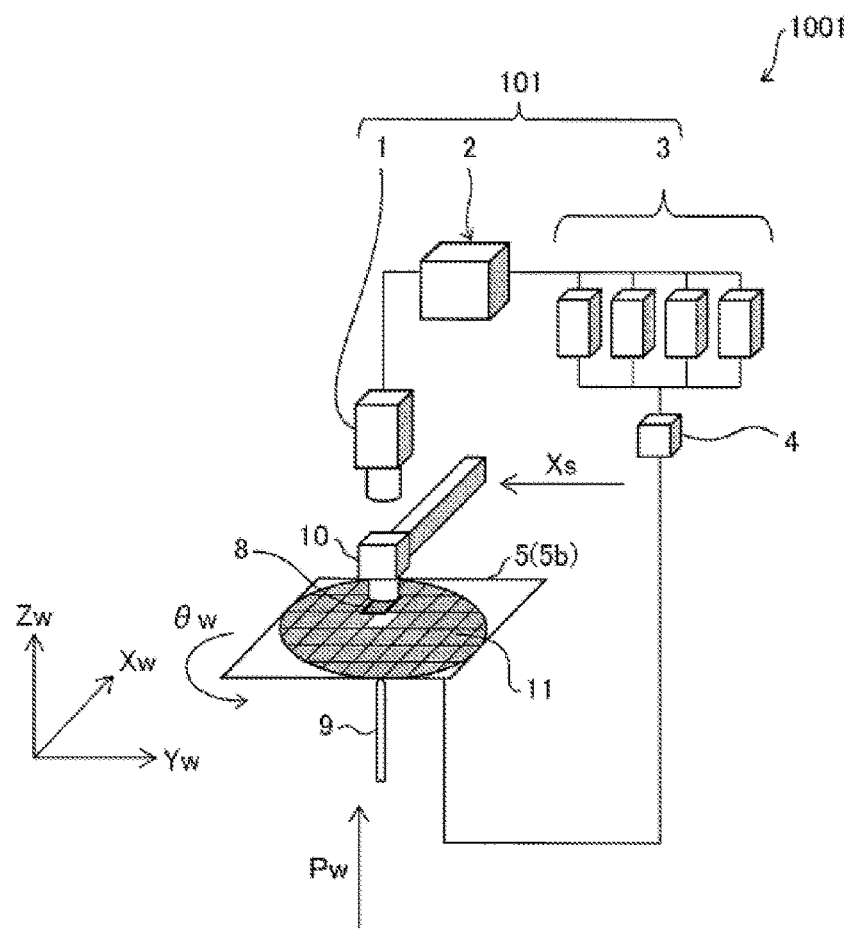
FIG. 2 is a schematic view showing another example of the system including the actuator control system of the present invention.

FIG. 2 is a schematic view showing a system 1001 including an actuator control system 101. The system 1001 includes the actuator control system 101, an actuator 4, a driving target 5, a chip push-up member 9, and a chip acquiring head 10. The actuator control system 101 includes a sensor unit 1 (excluding an object information acquiring unit 22, which will be described later), a control apparatus 2, and a drive circuit 3. In the system 1001, the driving target 5 is a stage 5b configured to be mechanically operated by the actuator 4.

The sensor unit 1 detects the position and the shape of the target object 8 (a chip that is to be acquired (taken up), in this example) formed in a wafer 11. The control apparatus 2 computes a command value for controlling driving of the actuator 4, based on the data supplied from the sensor unit 1, and supplies it to the drive circuit 3. In the system 1001, the target object 8 is guided to a position directly under the chip acquiring head 10, and the target object 8 that has been guided to a position directly under the chip acquiring head 10 is pushed up from below by the chip push-up member 9. The chip acquiring head 10 acquires the target object 8 that has been pushed up at a position directly under the chip acquiring head 10.

Note that the stage 5b moves along four axes, namely an Xw axis, a Yw axis, a Zw axis, and a θw axis in FIG. 2. FIG. 2 also shows a Pw axis that is an axis along which the chip push-up member 9 moves, and an Xs axis that is one of the axes along which the chip acquiring head 10 moves.

Figure 3:
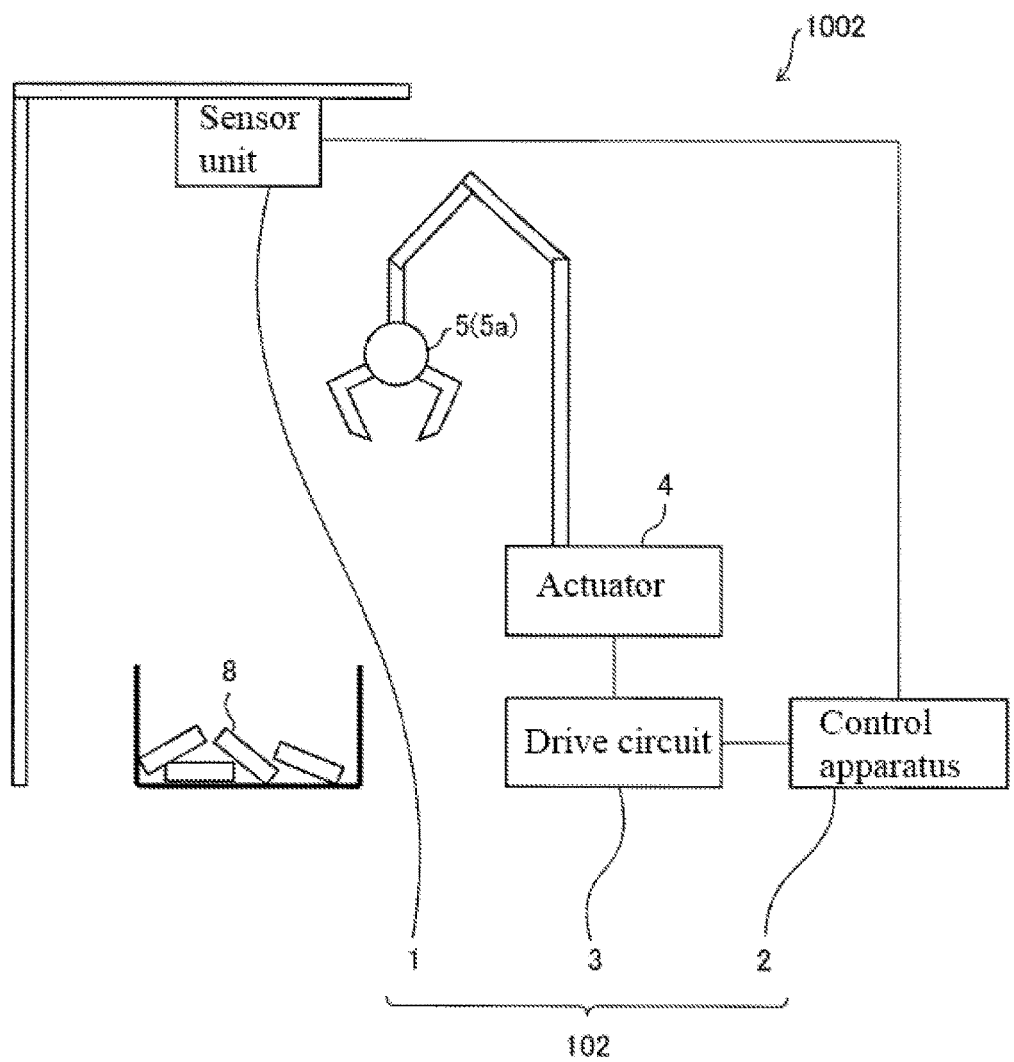
FIG. 3 is a schematic view showing another example of the system including the actuator control system of the present invention.

FIG. 3 is a schematic view showing a system 1002 including an actuator control system 102. The system 1002 includes the actuator control system 102, an actuator 4, and a driving target 5. The actuator control system 102 includes a sensor unit 1 (excluding an object information acquiring unit 22, which will be described later), a control apparatus 2, and a drive circuit 3. In the system 1002, the driving target 5 is the robot 5a configured to grip and move the target object 8.

The sensor unit 1 can detect the target object 8 from an image captured by the sensor unit 1, thereby detecting three-dimensional coordinates of the target object 8. That is to say, it is possible to detect the target object 8 as two-dimensional coordinates from a plurality of images (a plurality of captured images obtained by capturing images of the target object from a plurality of angles) captured by the sensor unit 1, and detect the three-dimensional coordinates of the target object 8 based on the plurality of sets of two-dimensional coordinates.

Figure 4:
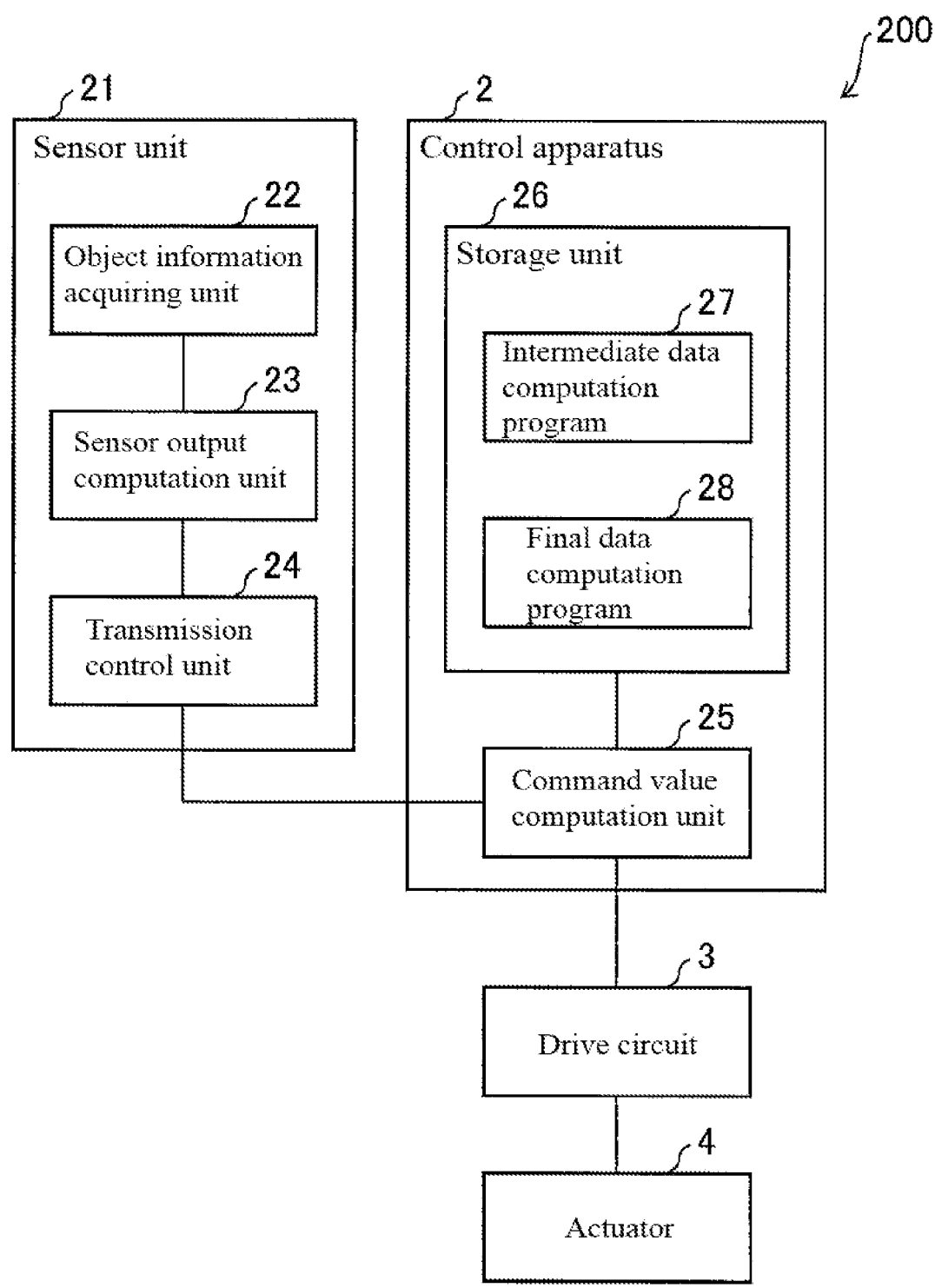
FIG. 4 is a block diagram of the actuator control system according to an embodiment of the present invention.

FIG. 4 is a block diagram of an actuator control system 200. It is particularly preferable to use the actuator control system 200 as either the actuator control system 100 or the actuator control system 102.

The actuator control system 200 includes a sensor unit 21 (excluding an object information acquiring unit 22, which will be described later), the control apparatus 2, and the drive circuit 3.

The sensor unit 21 is constituted by the sensor unit 1, or the sensor units 1a and 1b. The sensor unit 21 includes an object information acquiring unit 22, a sensor output computation unit 23, and a transmission control unit 24.

The object information acquiring unit 22 acquires information on the target object 8 (see FIG. 1). Specifically, the object information acquiring unit 22 captures an image of the target object 8, thereby acquiring a signal of the captured image of the target object 8. In the actuator control system 200, this signal is used as a sensor output signal.

The signal of the captured image of the target object 8 is supplied from the object information acquiring unit 22 to the sensor output computation unit 23. The sensor output computation unit 23 performs a computation on the signal supplied to it.

Figure 5:
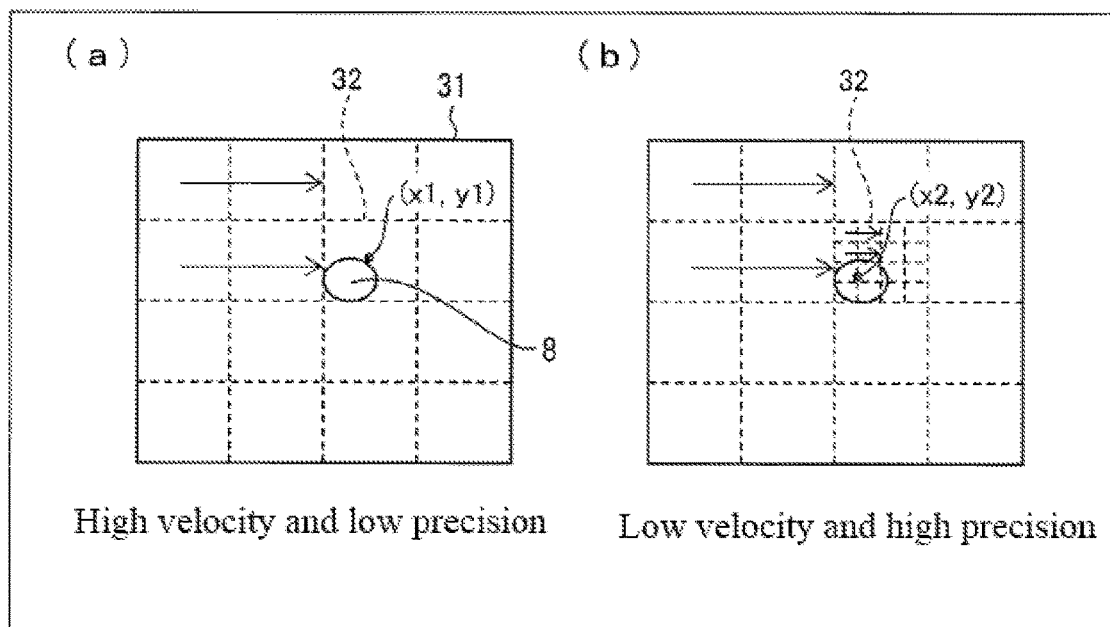

Hereinafter, an example of the computation by the sensor output computation unit 23 will be described with reference to FIG. 5. FIG. 5 shows diagrams of examples of the computation by the sensor output computation unit 23.

FIG. 5(a) shows a rough search as a first position detecting process. In the rough search, the position of the target object 8 is detected from the captured image 31 at a first level of precision. Specifically, in the rough search, the captured image 31 is split into a plurality of regions (16 regions in FIG. 5(a)), and a region 32 containing a center position of the target object 8 is detected from among the plurality of regions. This rough search is performed in order to roughly detect the position of the target object 8, and thus the detection is performed at relatively high velocity although the first level of precision is relatively low. In this example, the coordinates of the position of the target object 8 obtained through the rough search are taken to be (x1,y1).

FIG. 5(*b*) shows a fine search as a second position detecting process. In the fine search, the position of the target object 8 is detected from the captured image 31 at a second level of precision. Specifically, in the fine search, the region 32 is split into a plurality of regions (16 regions in FIG. 5(*b*)), and the position of the target object 8 is accurately detected by recognizing which region contains the center position of the target object 8. This fine search is performed in order to detect the position of the target object 8 more accurately than the rough search, and thus the second level of precision is higher than the first level of precision although the detection is performed more slowly than the rough search. In this example, the coordinates of the position of the target object 8 obtained through the fine search are taken to be (x2,y2).

As another method for performing the rough search, it is also possible to perform processing on a small image obtained through compression. In this case, processing for the rough search is performed on a small image obtained through compression, and processing for the fine search is performed on the image before compression.

Moreover, as another method for performing the fine search, it is also possible to increase the number of patterns when performing pattern matching. Matching in the rough search is performed with a smaller number of patterns, and matching in the fine search is performed with a larger number of patterns so that the level of precision is improved.

The transmission control unit 24 transmits final data, which is a final result of the computation by the sensor output computation unit 23, and also transmits intermediate data before transmitting the final data. In this example, the intermediate data is data indicating the coordinates (x1,y1), which is the detection result of the rough search, and the final data is data indicating the coordinates (x2,y2), which is the detection result of the fine search.

The control apparatus 2 includes a command value computation unit 25 and a storage unit 26. The storage unit 26 stores an intermediate data computation program 27 and a final data computation program 28.

The command value computation unit 25 is constituted by, for example, a CPU, and computes a command value for driving the actuator 4, based on the intermediate data and the final data transmitted by the transmission control unit 24.

Specifically, when intermediate data indicating the coordinates (x1,y1) is supplied, the command value computation unit 25 reads the intermediate data computation program 27 from the storage unit 26. Then, the command value computation unit 25 computes a preliminary command value for preliminarily driving the actuator 4, based on the intermediate data. The preliminary command value is a command value for moving the driving target 5 to a position corresponding to the coordinates (x1,y1). The command value computation unit 25 supplies the preliminary command value to the drive circuit 3, and the drive circuit 3 controls driving of the actuator 4 based on the supplied preliminary command value.

Subsequently, when final data indicating the coordinates (x2,y2) is supplied, the command value computation unit 25 reads the final data computation program 28 from the storage unit 26. Then, the command value computation unit 25 computes a command value for driving the actuator 4, based on the intermediate data and the final data. This command value is a command value for moving the driving target 5 to a position corresponding to the coordinates (x2,y2), in consideration of control for driving of the actuator 4 already performed based on the preliminary command value. The command value is for changing the state (position, velocity, and acceleration) of the driving target 5 in accordance with a difference between the coordinates (x1, y1) and the coordinates (x2,y2), wherein the driving of the actuator 4 is controlled to move the driving target 5 at low velocity if the difference is small, and at high velocity if the difference is large. The command value computation unit 25 supplies the command value to the drive circuit 3, and the drive circuit 3 controls driving of the actuator 4 based on the supplied command value.

It may take time for the sensor output computation unit 23 to complete the computation of final data depending on the computation content. On the other hand, the command value computation unit 25 can receive intermediate data before receiving the final data. Accordingly, the command value computation unit 25 can perform its computation based on the intermediate data acquired before the sensor output computation unit 23 completes its computation of the final data. Thus, it is possible to control the actuator 4 at higher velocity or more precisely.

Furthermore, in the actuator control system 200, it is possible to preliminarily drive the actuator 4 in accordance with the preliminary command value based on the intermediate data. That is to say, it is possible to start the control for driving of the actuator 4 before the sensor output computation unit 23 completes its computation of the final data, and thus it is possible to perform the control at high velocity.

Furthermore, in the actuator control system 200, after positional detection at a relatively low level of precision is performed at high velocity in the rough search, positional detection at a higher level of precision is performed in the fine search. Accordingly, it is possible to perform positional detection at higher velocity than when performing positional detection at a high level of precision from the beginning.

Furthermore, a preliminary command value is calculated using a result of the rough search as intermediate data, and thus it is possible to start the control for driving of the actuator 4 before the sensor output computation unit 23 completes its computation of final data. That is to say, after driving of the actuator 4 is started based on the positional detection result with a relatively low level of precision, the driving of the actuator 4 can be completed to a precise position based on a positional detection result with a high level of precision, and thus it is possible to perform precise control at high velocity.

Figure 6:
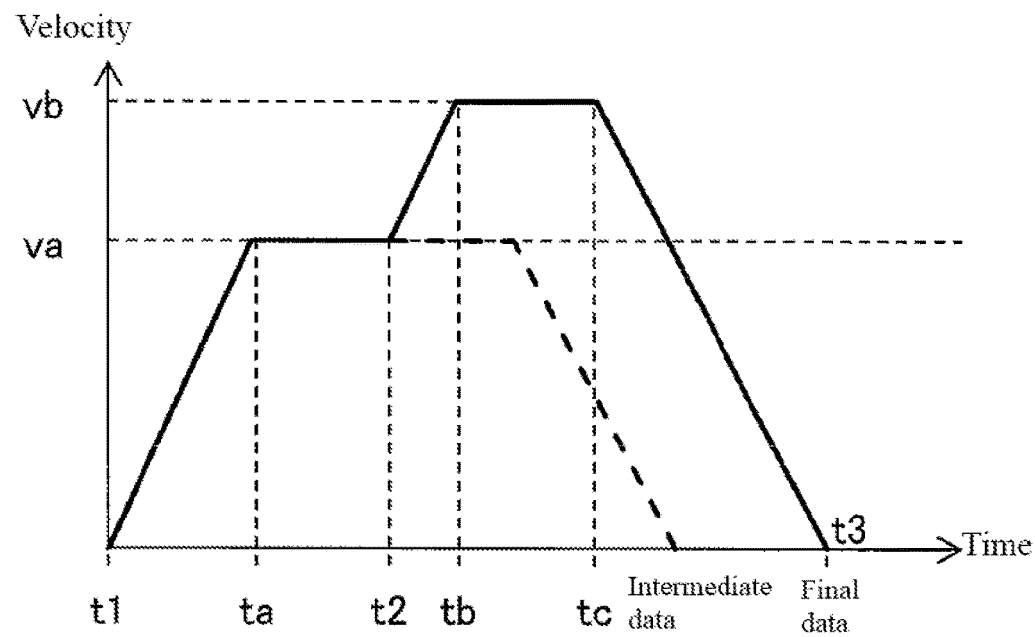
FIG. 6 is a graph showing a relationship of the movement velocity of an actuator driving target toward a target object with respect to the elapsed time.

FIG. 6 is a graph showing a relationship of the movement velocity of the driving target 5 toward the target object 8 with respect to the elapsed time.

A time t1 is a time when the control for driving of the actuator 4 is started based on the preliminary command value. A time t2 is a time when the control for driving of the actuator 4 is started based on the command value. A time t3 is a time when control for driving of the actuator 4 is ended.

The actuator 4 starts movement of the driving target 5 at time t1, and accelerates the driving target 5 at a constant acceleration until the movement velocity of the driving target 5 reaches a predetermined velocity va. In FIG. 6, the time when the movement velocity of the driving target 5 reaches the velocity va is the time ta.

The actuator 4 moves the driving target 5 at a constant velocity (i.e., the velocity va) from the time ta to the time t2.

The actuator 4 accelerates the movement of the driving target 5 from the time t2, and accelerates the driving target 5 at a constant acceleration until the movement velocity of the driving target 5 reaches a predetermined velocity vb. In FIG. 6, the time when the movement velocity of the driving target 5 reaches the velocity vb is the time tb.

The actuator 4 moves the driving target 5 at a constant velocity (i.e., the velocity vb) from the time tb to a time tc.

The actuator 4 decelerates the movement of the driving target 5 from the time tc, and decelerates the driving target 5 at a constant deceleration until the movement velocity of the driving target 5 reaches 0. In FIG. 6, the time when the movement velocity of the driving target 5 reaches 0 is the time t3.

Figure 7:
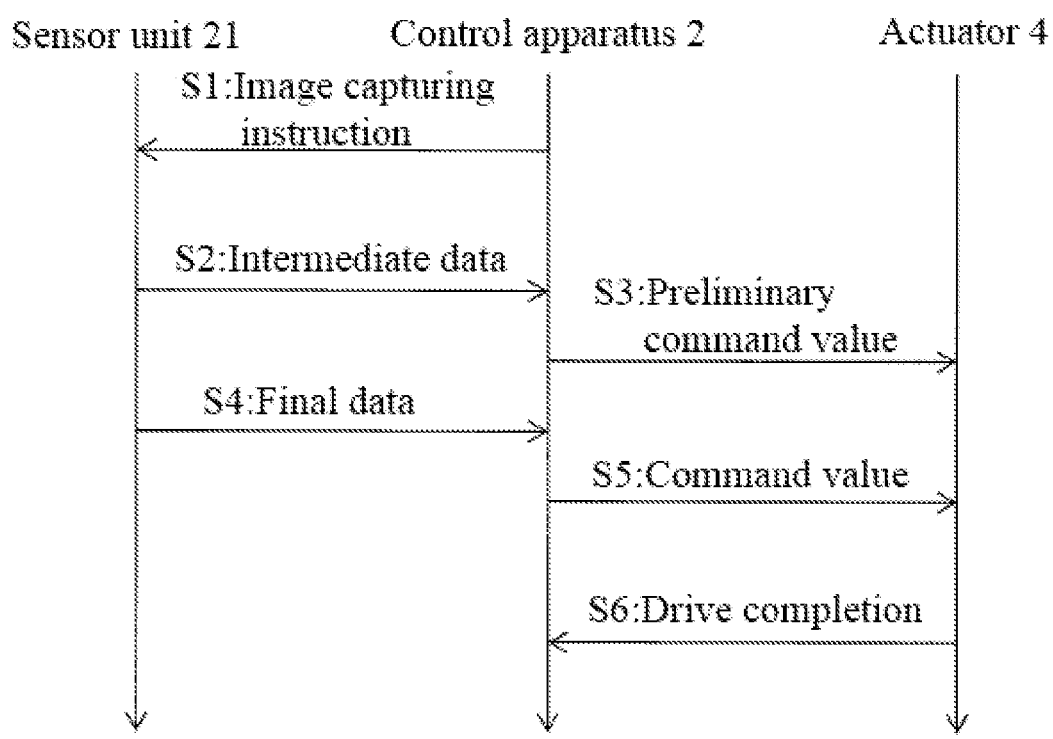
FIG. 7 is a timing chart showing an operation flow of the actuator control system shown in FIG. 4.

FIG. 7 is a timing chart showing an operation flow of the actuator control system 200. Note that a specific processing flow of the sensor unit 21 and the control apparatus 2 is as described with reference to FIG. 4, and thus a description thereof has been omitted. Furthermore, the operation content of the drive circuit 3 does not directly affect the control content of driving of the actuator 4, and thus the drive circuit 3 is not shown in FIG. 7.

First, the control apparatus 2 transmits an image capturing instruction to the sensor unit 21 (Step S1). Subsequently, the sensor unit 21 transmits intermediate data to the control apparatus 2 (Step S2). Subsequently, the control apparatus 2 computes a preliminary command value based on the intermediate data, and preliminarily controls driving of the actuator 4 based on the preliminary command value (Step S3). Subsequently, the sensor unit 21 transmits final data to the control apparatus 2 (Step S4). Subsequently, the control apparatus 2 computes a command value based on the intermediate data and the final data, and controls driving of the actuator 4 based on the command value (Step S5). Lastly, the actuator 4 notifies the control apparatus 2 that driving is completed (Step S6).

Hereinafter, a specific application example in the case where the sensor unit 21 is constituted by the sensor units 1a and 1b will be described.

If two sensor units consisting of the sensor units 1a and 1b are used, examples of detection results of the rough search include not only the coordinates (x1,y1), which are two-dimensional coordinates of the target object 8, but also the three-dimensional coordinates (x1,y1,z1) of the target object 8 and the orientation of the target object 8. The coordinates (x1,y1) are mainly for determining whether or not the target object 8 is present. The three-dimensional coordinates (x1,y1,z1) are mainly for roughly determining the location at which the robot 5a serving as the driving target 5 grips the target object 8. The orientation of the target object 8 is mainly for roughly determining the method by which the robot 5a grips the target object 8. In the actuator control system 200, data of the coordinates (x1,y1), data of the three-dimensional coordinates (x1,y1,z1), or data of the orientation of the target object 8, or a combination of two or more types of this data can be used as the intermediate data.

Figure 8:
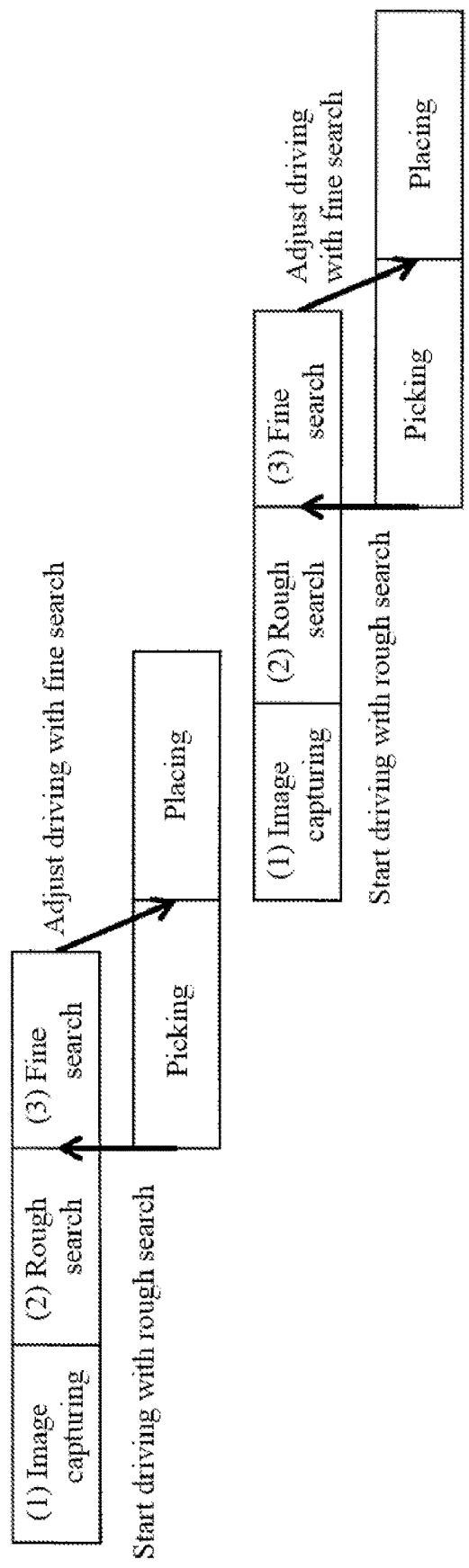
FIG. 8 is another timing chart showing an operation flow of the actuator control system shown in FIG. 4.

FIG. 8 is another timing chart showing an operation flow of the actuator control system 200. FIG. 8 can be referred to as an example of a timing chart according to the above-described specific application example. Note that a specific processing flow of the sensor unit 21 and the control apparatus 2 is as described with reference to FIG. 4, and thus a description thereof has been omitted. Furthermore, the operation content of the drive circuit 3 does not directly affect the control content of driving of the actuator 4, and thus the drive circuit 3 is not shown in FIG. 8.

In the timing chart shown in FIG. 8, capturing an image of the target object 8 by the sensor unit 21, rough search, and fine search are performed in this order. Then, the time to start picking, which is a series of operations related to the robot 5a serving as the driving target 5 gripping the target object 8, is immediately after the rough search is ended. The reason for this is that it is possible to move the robot 5a toward the target object 8 immediately after the rough search is ended, due to the control for driving of the actuator 4 by the actuator control system 200 based on the preliminary command value. The picking is continued after the fine search is completed, until the control for driving of the actuator 4 by the actuator control system 200 based on the command value is completed. Subsequently, placing, which is a series of operations of conveying the target object 8 to a predetermined position, is performed.

In the timing chart shown in FIG. 8, according to the actuator control system 200 related to the above-described specific application example, there is a time when the fine search and the picking are simultaneously performed. Accordingly, the total of the fine search time and the picking time can be shortened, and thus it is possible to control the actuator 4 at high velocity.

Figure 9:
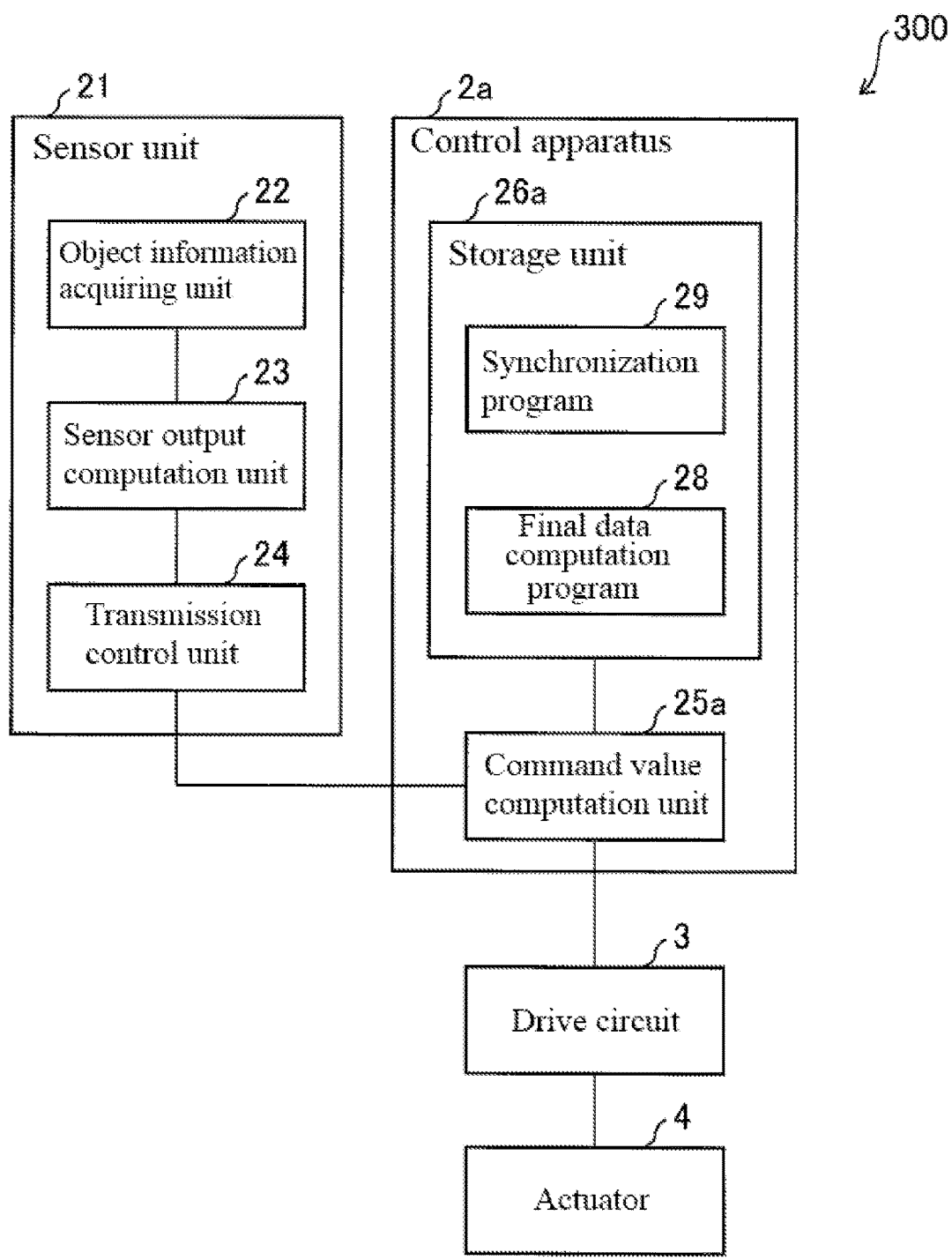
FIG. 9 is a block diagram of an actuator control system according to another embodiment of the present invention.

FIG. 9 is a block diagram of an actuator control system 300. It is particularly preferable to use the actuator control system 300 as the actuator control system 101.

The actuator control system 300 includes the sensor unit 21 (excluding the object information acquiring unit 22), a control apparatus 2a, and the drive circuit 3.

The control apparatus 2a includes a command value computation unit 25a and a storage unit 26a. The storage unit 26a stores the final data computation program 28 and a synchronization program 29.

The command value computation unit 25a is constituted by, for example, a CPU, and computes a command value for driving the actuator 4, based on the intermediate data and the final data transmitted by the transmission control unit 24.

Specifically, in the actuator control system 300, the intermediate data is data of information at the time (image capturing time) when a signal (sensor output signal) of a captured image of the target object 8 is output from the object information acquiring unit 22. Then, when the intermediate data and control information of the actuator 4, which is supplied from the actuator 4, are supplied, the command value computation unit 25a reads the synchronization program 29 from the storage unit 26a. Note that the control information of the actuator 4 contains information indicating a current position of the driving target 5, and a latch time at which the actuator 4 latches a signal. Then, the command value computation unit 25a synchronizes the sensor unit 21 and the actuator 4 based on the intermediate data and the control information.

Subsequently, when final data indicating the coordinates (x2,y2) is supplied, the command value computation unit 25a reads the final data computation program 28 from the storage unit 26a. The operations after the command value computation unit 25a reads the final data computation program 28 from the storage unit 26a are similar to those after the command value computation unit 25 reads the final data computation program 28 from the storage unit 26.

In the actuator control system 300, even if there is a time lag between when a signal of the captured image of the target object 8 is output from the object information acquiring unit 22 and when the actuator 4 is driven, the command value computation unit 25a can compute a command value in consideration of the time lag. Accordingly, it is possible to control the actuator 4 at a higher level of precision Furthermore, in order to synchronize output of the sensor unit 21 and control of the actuator 4, these units may be connected via a wire. However, in the actuator control system 300, it is not necessary to provide wiring for such a wired connection. Accordingly, it is possible to simplify the hardware, and improve the degree of freedom in arranging the hardware.

Figure 10:
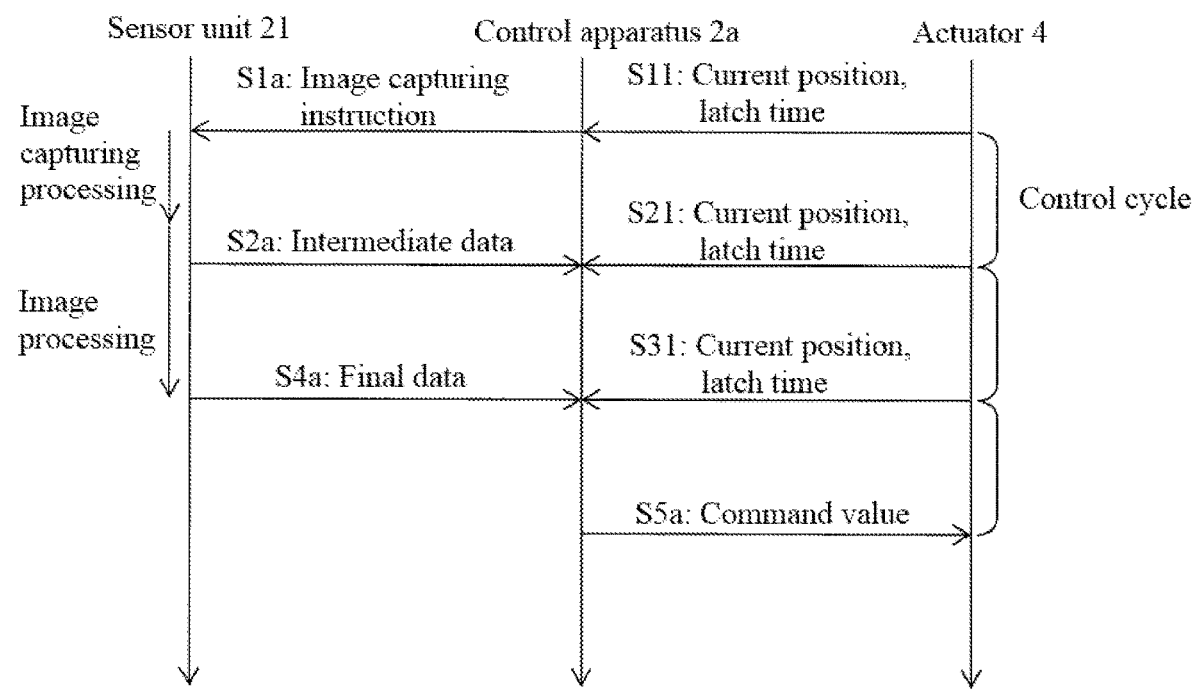
FIG. 10 is a timing chart showing an operation flow of the actuator control system shown in FIG. 9.

FIG. 10 is a timing chart showing an operation flow of the actuator control system 300. Note that a specific processing flow of the sensor unit 21 and the control apparatus 2a is as described with reference to FIG. 9, and thus a description thereof has been omitted. Furthermore, the operation content of the drive circuit 3 does not directly affect the control content of driving of the actuator 4, and thus the drive circuit 3 is not shown in FIG. 10.

First, the control apparatus 2a transmits an image capturing instruction to the sensor unit 21 (Step S1a). At this time, the control apparatus 2a captures control information (current position, latch time) of the actuator 4 from the actuator 4 (Step S11). Subsequently, the sensor unit 21 transmits intermediate data to the control apparatus 2a (Step S2a). At this time, the control apparatus 2a captures control information (current position, latch time) of the actuator 4 from the actuator 4 (Step S21). Subsequently, the sensor unit 21 transmits final data to the control apparatus 2a (Step S4a). At this time, the control apparatus 2a captures control information (current position, latch time) of the actuator 4 from the actuator 4 (Step S31). Subsequently, the control apparatus 2a computes a command value based on the intermediate data and the final data, and controls driving of the actuator 4 based on the command value (Step S5a). Lastly, the actuator 4 may notify the control apparatus 2a that driving is completed, via the drive circuit 3.

Steps S11, S21, and S31 are performed in predetermined control cycles. Then, steps S1a, S2a, and S4a are respectively synchronized with steps S11, S21, and S31. In this example, the control apparatus 2a can obtain information of the image capturing time and information of the current position and the latch time of the actuator 4 at the timings of steps S2a and S21, and thus it is possible to start the computation of the command value before steps S4a and S31. Accordingly, it is possible to perform the processing at high velocity.

Figure 11:
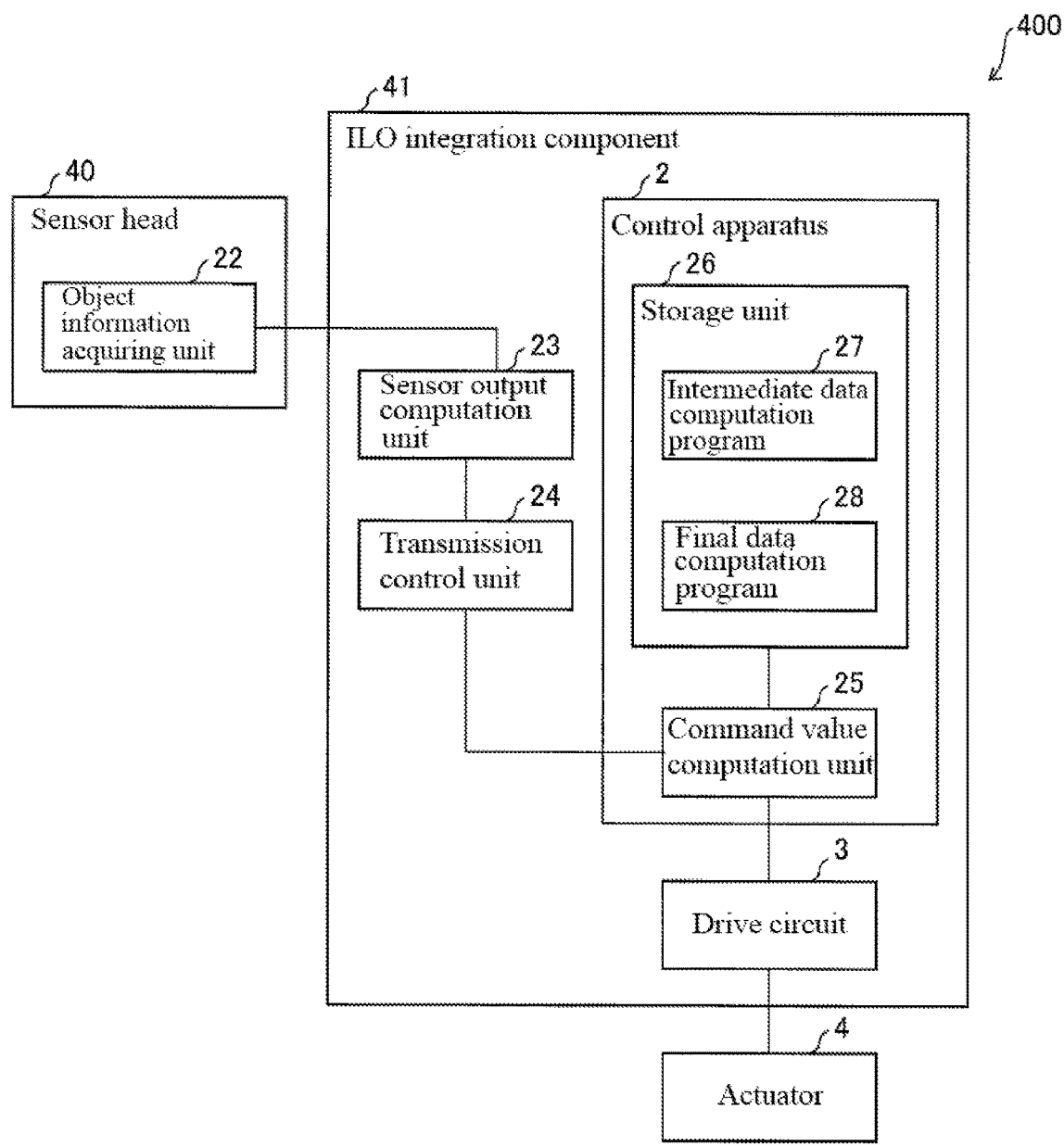
FIG. 11 is a block diagram of an actuator control system according to another embodiment of the present invention.
Figure 12:
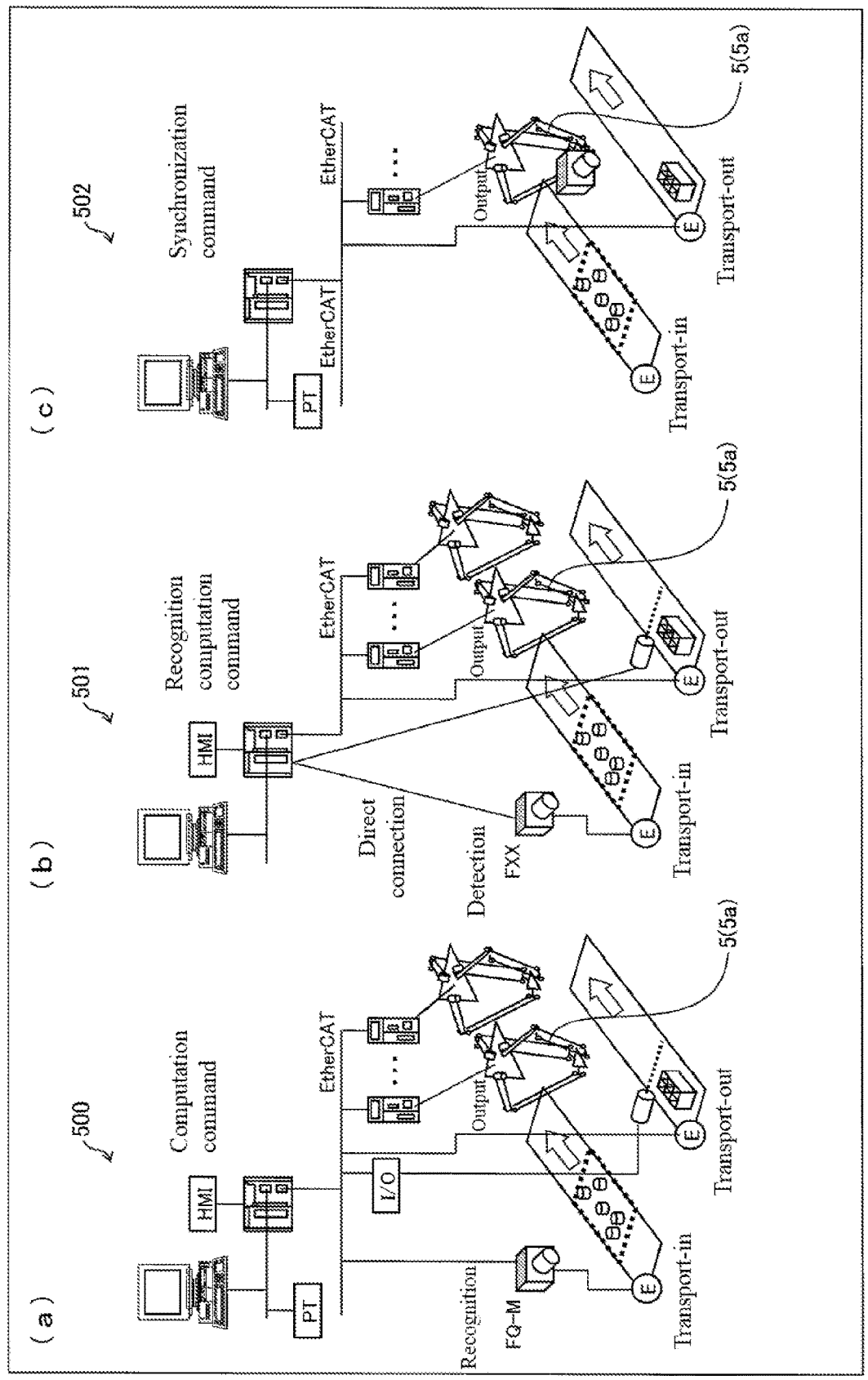
FIGS. 12(a) to 12(c) are illustrations showing advantages of application of an ILO integration component.

FIG. 11 is a block diagram of an actuator control system 400. It is particularly preferable to use the actuator control system 400 as either the actuator control system 100 or the actuator control system 102.

The actuator control system 400 includes an ILO integration component 41.

The sensor head 40 includes the object information acquiring unit 22. The ILO integration component 41 includes the sensor output computation unit 23, the transmission control unit 24, the control apparatus 2, and the drive circuit 3. That is to say, in the actuator control system 400, the object information acquiring unit 22 constituting the sensor head 40 and the sensor output computation unit 23 and the transmission control unit 24 constituting the peripheral circuitry of the sensor head 40 are provided as separate members.

According to the actuator control system 400 constituting the ILO integration component 41, and integrating and reconstructing a control logic, it is possible to reduce the apparatus size, to increase the velocity and precision of the control, and to simplify the control. Especially in the actuator control system 400, it can be expected to increase the velocity of throughput, to synchronize asynchronous control, and to share the above-described intermediate data, for example.

Note that the actuator control system 400 is obtained by applying, to the actuator control system 200, a configuration in which the object information acquiring unit 22, and the sensor output computation unit 23 and the transmission control unit 24 are provided as separate members. It is also possible to apply a configuration in which the object information acquiring unit 22, and the sensor output computation unit 23 and the transmission control unit 24 are provided as separate members to the actuator control system 300 in a similar manner.

FIGS. 12(a) to 12(c) are illustrations showing advantages of application of the ILO integration component 41.

A system 500 in FIG. 12(a) is an example of a system in which the actuator control system 200 or 300 is mounted. In this case, in consideration of the movement velocity of the robot 5a that is the driving target 5, four robots 5a are necessary.

A system 501 in FIG. 12(b) is an example of the system 500 in which the control apparatus 2, and members directly related to the operation of the control apparatus 2 are provided as one integrated circuit. In this case, in consideration of the movement velocity of the robot 5a that is the driving target 5, it seems possible that two robots 5a operate at a similar velocity to that of the system 500.

A system 502 in FIG. 12(c) is an example of a system in which the actuator control system 400 is mounted. In this case, in consideration of the movement velocity of the robot 5a that is the driving target 5, it seems possible that one robot 5a operates at a similar velocity to that of the system 500.

As a technique for using intermediate data, the following technique is also conceivable.

That is to say, there is a conventional problem in which, since a threshold for the light receiving amount of a fiber sensor is manually adjusted, it has to be readjusted when an environment (brightness) changes. If the light receiving amount of a fiber sensor is taken as intermediate data and used in a control apparatus, the threshold can be automatically adjusted. Accordingly, effects can be expected that the threshold is automatically adjusted (provided as feedback), the robustness against changes in an environment is improved, and malfunctions of the fiber sensor are detected at an early stage based on signs in the hardware. If the light receiving amount is made visible on a control apparatus or a display apparatus, malfunctions can be detected at an early stage based on signs in the hardware.

The control block of the actuator control systems 200, 300, and 400 may be realized by a logical circuit (hardware) formed in an integrated circuit (IC chip) or the like, or may be realized by software using a CPU (central processing unit).

In the latter case, each of the actuator control systems 200, 300, and 400 includes a CPU that executes commands for a program, which is software that executes functions, a ROM (read only memory) or a storage apparatus (these are called "storage media") that stores the above-described program and various types of data in a manner of being readable by a computer (or a CPU), a RAM (random access memory) for expanding the above-described program, and the like. Also, the computer (or CPU) reads the above-described program from the above-described storage medium and executes it, whereby the object of the present invention is achieved. As the above-described storage medium, a "non-transitory tangible medium" such as a tape, a disk, a card, a semiconductor memory, or a programmable logic circuit can be used. Also, the above-described program may be supplied to the above-described computer via any transmission medium (a communication network, a broadcasting wave, or the like) that can transmit the program. Note that the present invention can also be realized in the form of a data signal embedded in a broadcasting wave in which the above-described program is realized by electronic transmission.

SUMMARY

An aspect of the present invention is directed to an actuator control system for controlling driving of an actuator based on a sensor output signal, the system including: a sensor output computation unit configured to perform a computation on the sensor output signal; a transmission control unit configured to transmit final data, which is a final result of the computation by the sensor output computation unit, and to transmit intermediate data before transmitting the final data; and a command value computation unit configured to compute a command value for driving the actuator, based on the intermediate data and the final data transmitted by the transmission control unit.

In the above-described configuration, it may take time for the sensor output computation unit to complete the computation of final data depending on the computation content. However, with this configuration, the command value computation unit can receive intermediate data before receiving the final data. Accordingly, the command value computation unit can perform a computation based on the intermediate data acquired before the sensor output computation unit completes its computation of the final data. Thus, it is possible to control the actuator at higher velocity or more precisely.

Furthermore, it is preferable that the command value computation unit computes a preliminary command value for preliminarily driving the actuator, based on the intermediate data.

With this configuration, it is possible to preliminarily drive the actuator in accordance with the preliminary command value based on the intermediate data. That is to say, it is possible to start the control for driving of the actuator before the sensor output computation unit completes its computation of final data, and thus it is possible to perform the control at high velocity.

Furthermore, in the actuator control system according to an aspect of the present invention, it is preferable that the sensor output signal is a signal of a captured image obtained by capturing an image of a target object, the sensor output computation unit performs: a first position detecting process that detects a position of the target object at a first level of precision; and a second position detecting process that detects a position of the target object at a level of precision that is higher than the first level of precision, and the intermediate data is a detection result of the first position detecting process.

In this configuration, after positional detection at a relatively low level of precision is performed at high velocity in the first position detecting process, positional detection at a higher level of precision is performed in the second position detecting process. Accordingly, it is possible to perform positional detection at higher velocity than when performing positional detection at a high level of precision from the beginning.

Furthermore, a preliminary command value is calculated using a result of the first position detecting process as intermediate data, and thus it is possible to start the control for driving of the actuator before the sensor output computation unit completes its computation of final data. That is to say, after driving of the actuator is started based on the positional detection result with a relatively low level of precision, the driving of the actuator can be completed to a precise position based on a positional detection result with a high level of precision, and thus it is possible to perform precise control at high velocity.

Furthermore, in the actuator control system according to an aspect of the present invention, it is preferable that the sensor output signal is a signal of a plurality of captured images obtained by capturing images of the target object from a plurality of angles, and the sensor output computation unit: as the first position detecting process, detects the target object as two-dimensional coordinates from each of the plurality of captured images; and as the second position detecting process, detects three-dimensional coordinates of the target object based on the plurality of sets of two-dimensional coordinates.

With this configuration, after driving of the actuator is started when a target object is detected in the first position detecting process, precise driving of the actuator can be completed with respect to a three-dimensional position based on three-dimensional coordinates obtained in the second position detecting process. It takes a relatively long time to calculate three-dimensional coordinates in the second position detecting process, but it is possible to perform the control at high velocity by starting driving of the actuator based on a result of the first position detecting process.

Furthermore, it is preferable that the intermediate data is information at a time when the sensor output signal is output, and the command value computation unit computes the command value with reference to the information at that time.

With this configuration, even if there is a time lag between when a sensor output signal is output and when the actuator is driven, the command value computation unit can compute a command value in consideration of this time lag. Accordingly, it is possible to control the actuator at a higher level of precision.

Furthermore, in order to synchronize output of the sensor and control of the actuator, these units may be connected via a wire. However, with this configuration, it is not necessary to provide wiring for such a wired connection. Accordingly, it is possible to simplify the hardware, and improve the degree of freedom in arranging the hardware.

Furthermore, an aspect of the present invention is directed to an actuator control method for controlling driving of an actuator based on a sensor output signal, the method including: a sensor output computation step of performing a computation on the sensor output signal; a transmission control step of transmitting final data, which is a final result of the computation in the sensor output computation step, and transmitting intermediate data before transmitting the final data; and a command value computation step of computing a command value for driving the actuator, based on the intermediate data and the final data transmitted in the transmission control step.

With this configuration, it is possible to realize the actuator control method having similar effects to those of the actuator control system of the present invention.

Note that an information processing program for causing a computer to function as the actuator control system according to any one of the above-described aspects of the present invention, wherein the computer is caused to function as the above-described units, falls within the scope of the present invention. Furthermore, a computer-readable storage medium storing the above-described information processing program also falls within the scope of the present invention.

The present invention is not limited to the above-described embodiments and can be modified in various ways within the scope indicated in the claims, and the technical scope of the present invention encompasses embodiments obtained by combining technical means disclosed in different embodiments.

INDEX TO THE REFERENCE NUMERALS 2, 2a Control apparatus
4 Actuator
8 Target object
23 Sensor output computation unit
24 Transmission control unit
25, 25a Command value computation unit
31 Captured image
100, 101, 102, 200, 300, 400 Actuator control system

The invention claimed is:

1. An actuator control system for controlling driving of an actuator based on a sensor output signal, the system comprising:
  a processor configured with a program to perform operations comprising:
    operation as a sensor output computation unit configured to compute, based on the sensor output signal:
    intermediate data having a first level of precision; and
    final data having a second level of precision higher than the first level of precision;
    operation as a transmission control unit configured to transmit the intermediate data and the final data such that the intermediate data is transmitted before transmitting the final data; and
    operation as a command value computation unit configured to compute: a preliminary command value for preliminarily driving the actuator, based on the intermediate data; and a command value for driving the actuator, based on a difference between the intermediate data and the final data, wherein
    the sensor output signal comprises a signal of a captured image obtained by capturing an image of a target object,
    the processor is configured with the program such that operation as the sensor output computation unit comprises performing, for a single operation of capturing the image, both a first position detecting process and a second position detecting process,
    the first position detecting process detecting a position of the target object at the first level of precision,
    the second position detecting process detecting a position of the target object at the second level of precision,
    the intermediate data comprises a detection result obtained by the first position detecting process,
    the final data comprises a detection result obtained by the second position detecting process, and
    the processor is configured with the program to perform, for the single operation of capturing the image, the operation as the transmission control unit configured to transmit both the intermediate data and the final data and the operation as the command value computation unit configured to compute both the command value and the preliminary command value.

2. The actuator control system according to claim 1, wherein the sensor output signal comprises a signal of a plurality of captured images of the target object from a plurality of angles, and
  the processor is configured with the program such that, for the single operation of capturing each of the plurality of captured images, operation as the sensor output computation unit comprises:
    detecting, as the first position detecting process, the target object as two-dimensional coordinates; and
    detecting, as the second position detecting process, three-dimensional coordinates of the target object based on the two-dimensional coordinates.

3. A non-transitory computer-readable storage medium storing an information processing program for causing a computer to function as the actuator control system according to claim 1, wherein the computer comprises the processor.

4. A non-transitory computer-readable storage medium storing an information processing program for causing a computer to function as the actuator control system according to claim 2, wherein the computer comprises the processor.

5. An actuator control method for controlling driving of an actuator based on a sensor output signal, the method comprising:
  (a) computing, based on the sensor output signal:
    intermediate data having a first level of precision; and
    final data having a second level of precision higher than the first level of precision;
  (b) transmitting the intermediate data and the final data such that the intermediate data is transmitted before transmitting the final data; and
  (c) computing: a preliminary command value for preliminarily driving the actuator, based on the intermediate data; and a command value for driving the actuator, based on a difference between the intermediate data and the final data, wherein
  the sensor output signal comprises a signal of a captured image obtained by capturing an image of a target object,
  the step (a) further comprises performing, for a single operation of capturing the image, both a first position detecting process and a second position detecting process,
    the first position detecting process detecting a position of the target object at the first level of precision,
    the second position detecting process detecting a position of the target object at the second level of precision, and
  the intermediate data comprises a detection result obtained by the first position detecting process,
  the final data comprises a detection result obtained by the second position detecting process, and
  the step (b) transmits both the intermediate data and the final data for the single operation of capturing the image, and
  the step (c) computes both the command value and the preliminary command value for the single operation of capturing the image.

6. The method according to claim 5, wherein
  the sensor output signal comprises a signal of a plurality of captured images of the target object from a plurality of angles, and
  performing, for the single operation of capturing each of the plurality of images, both the first position detecting process and the second position detecting process further comprises:
    detecting, as the first position detecting process, the target object as two-dimensional coordinates; and
    detecting, as the second position detecting process, three-dimensional coordinates of the target object based on the dimensional coordinates.

7. A sensor device for controlling driving of an actuator based on a sensor output signal, comprising:

a processor configured with a program to perform operations comprising:
  operation as a sensor output computation unit configured to perform a computation on the sensor output signal; and
  operation as a transmission control unit configured to transmit final data, which is a final result of the computation performed by the sensor output computation unit, and to transmit intermediate data before transmitting the final data, wherein
the sensor output signal is a signal of a captured image obtained by capturing an image of a target object,
the processor is configured with the program such that operation as the sensor output computation unit comprises performing, for a single operation of capturing the image, both a first position detecting process and a second position detecting process,
  the first position detecting process detecting a position of the target object at a first level of precision,
  the second position detecting process detecting a position of the target object at a second level of precision higher than the first level of precision,
the intermediate data comprises a detection result obtained by the first position detecting process,
the final data comprises a detection result obtained by the second position detecting process,
the intermediate data and the final data comprise results of computations on the same sensor output signal, and
the processor is configured with the program to perform, for the single operation of capturing the image, the operation as the transmission control unit configured to transmit both the intermediate data and the final data.

8. The sensor device according to claim 7, wherein
the sensor output signal is a signal of a plurality of captured images obtained by capturing images of the target object from a plurality of angles, and the processor is configured with the program to perform operation such that, for the single operation of capturing performed for each of the plurality of captured images, operation as the sensor output computation unit performs operations further comprising:
  as the first position detecting process, detecting the target object as two-dimensional coordinates; and
  as the second position detecting process, detecting three-dimensional coordinates of the target object based on the two-dimensional coordinates.

9. A control device for controlling driving of an actuator based on a sensor output signal, comprising:
  a processor configured with a program to perform operation as a command value computation unit configured to compute: a command value for driving the actuator, based on a difference between intermediate data and final data each obtained by a computation on the sensor output signal; and a preliminary command value for preliminarily driving the actuator based on the intermediate data, wherein
the sensor output signal comprises a signal of a captured image obtained by capturing an image of a target object,
the intermediate data comprises a detection result obtained by a first position detecting process detecting a position of the target object at a first level of precision,
the final data comprises a detection result obtained by a second position detecting process detecting a position of the target object at a second level of precision higher than the first level of precision, and
the processor is configured with the program to perform, for a single operation of capturing the image, the operation as the command value computation unit configured to compute both the command value and the preliminary command value.

* * * * *